United States Patent [19]

Gualtieri et al.

[11] Patent Number: 4,493,991

[45] Date of Patent: Jan. 15, 1985

[54] TECHNIQUES FOR LOCATING BEAMS WITHIN LARGE AREA DETECTORS

[75] Inventors: John G. Gualtieri, Oceanport; John R. Vig, Colts Neck, both of N.J.

[73] Assignee: The United States of America as represented by the Secretary of the Army, Washington, D.C.

[21] Appl. No.: 395,232

[22] Filed: Jul. 6, 1982

[51] Int. Cl.³ ............................................. G01J 1/20
[52] U.S. Cl. ............................. 250/203 R; 250/233
[58] Field of Search .............. 250/203 R, 233, 232; 356/141, 152

[56] References Cited

U.S. PATENT DOCUMENTS

| 3,177,366 | 4/1965 | Larchuk et al. | 250/233 |
| 3,220,298 | 11/1965 | Powell et al. | 250/233 |
| 3,944,167 | 3/1976 | Figler et al. | 250/233 |
| 4,286,760 | 9/1981 | Coudero et al. | 250/203 R |

Primary Examiner—Davis L. Willis
Assistant Examiner—James Gatto
Attorney, Agent, or Firm—Anthony T. Lane; Jeremiah G. Murray; Edward Goldberg

[57] ABSTRACT

Methods are shown for deducing the point of impingement of a beam, such as a particle or electromagnetic beam, on a planar detector which is much larger than the beam cross-section. The methods involve chopping the beam before it reaches the detector by means of a chopper which periodically obscures the field of view of the detector as a known function of the chopper motion, and then determining the point of impingement from output measurements of the detector and from the known geometry of the chopper and the detector.

4 Claims, 5 Drawing Figures

TECHNIQUES FOR LOCATING BEAMS WITHIN LARGE AREA DETECTORS

The invention described herein may be manufactured, used, and licensed by or the Government for governmental purposes without the payment to us of any royalties thereon.

BACKGROUND OF THE INVENTION

In fields such as x-ray crystallography a narrow beam of x-rays are often diffracted from the crystalline structure under study. Often for practical reasons these beams are detected with large area detectors having areas many times the cross-sectional area of the beam being detected. The present invention provides methods of precisely locating the point of impingement of such beams on such large area detectors. These techniques or methods are simpler and involve less cost than previously known techniques for accomplishing this purpose. The techniques are applicable to any continuous particle or electromagnetic beam, e.g., light, molecular or electron beams, x-rays or gamma rays, etc.

SUMMARY OF THE INVENTION

Both of these techniques involve chopping the beam before it reaches the detector, and correlating the motions and positions of the chopping means with the output of the detector to determine both the x and y coordinates of the point of impingement of the beam on the detector. In one embodiment a circular chopper disc is arranged between the beam source and the large area detector, with the disc normal to the beam path, parallel to the flat surface of the detector. A triangular aperture in the chopper disc has one of its leg along a radius of the disc and this leg is made slightly longer than the diameter of the circular beam detector. The chopper disc rotates at constant speed around its center, which is offset from the field of view of the detector. The detector is located so that the triangular aperture will completely scan the detector as the aperture sweeps by it. The triangular aperture causes different durations of detector output for beams at different distances from the chopper axis of rotation. Also, the elapsed time between the start of the scanning of the detector by the triangular aperture and the start of detected signal is an indication of the angular position of the beam's point of impingement relative to the chopper disc geometry. Thus, by measuring these two time intervals, the beam position can be accurately calculated, given the known geometry of the disc, its aperture and the detector.

An alternate embodiment involves a pair of flat choppers rotating around orthogonal axes which lie just outside the field of view of the detector. The choppers have straight sides parallel to their axes of rotation and a length normal to their axes of rotation sufficient to periodically obscure the field of view of the detector twice during each revolution thereof. The two choppers are alternately operated, with the inoperative one stopped in a rest position such that it does not interfere with the beam and the ratio of the "on" time to the "off" time of the detector output due to chopper rotation is a measure of the position of the beam on the detector along an axis normal to the axis of rotation of that chopper.

Further details as well as other objects and advantages of the invention will become apparent from the drawings and the following detailed description.

DETAILED DESCRIPTION OF A PREFERRED EMBODIMENT

Figure 1:
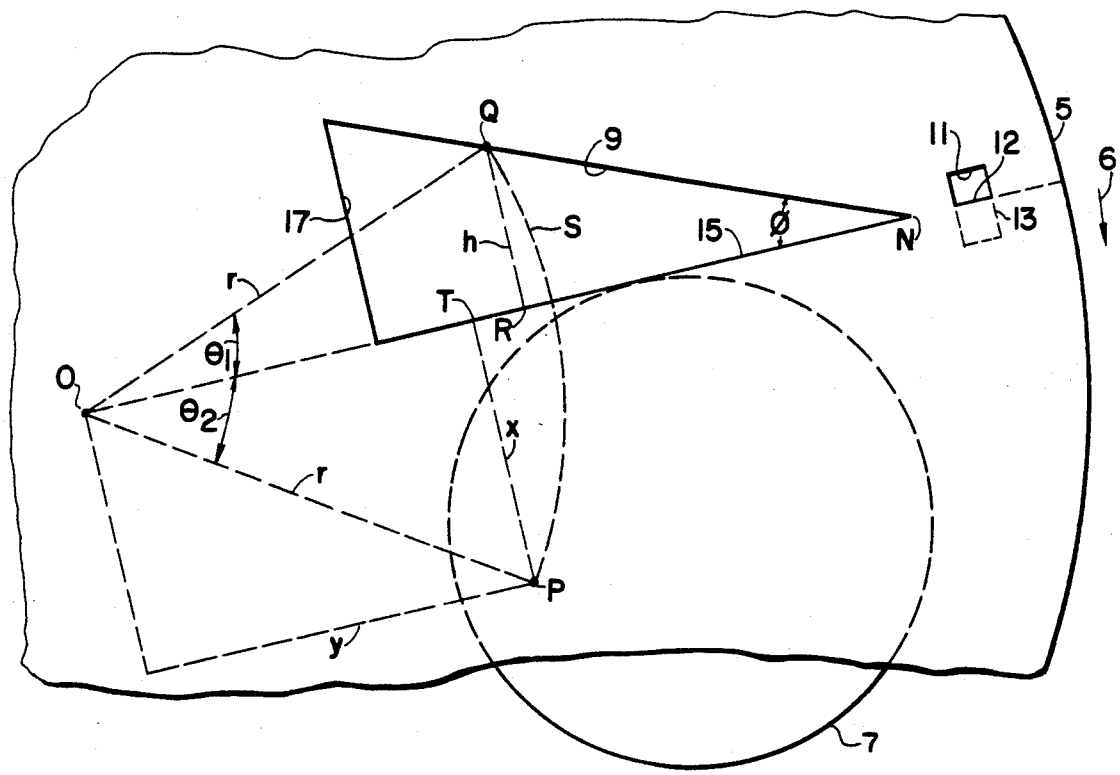
FIG. 1 is a diagram illustrating the technique utilizing a disc type chopper with a triangular aperture.

In FIG. 1, numeral 5 indicates the edge of a circular chopper wheel or disc which rotates around its center 0. The chopper disc 5 is located between the beam source and the beam detector and it rotates in a plane parallel to the flat circular detector 7. Thus FIG. 1 is a view looking from the source of the beam at the flat surface of the chopper disc with the detector 7 shown behind the opaque portion of the chopper. The right triangular aperture in the disc includes a hypotenuse 9, a longer side 15 and a shorter side 17, with the side 15 coinciding with a radius of the disc 5. The aperture side 15 is made slightly longer than the diameter of the detector 7 and the aperture is located such that the center of the longer side 15 will pass over the center of the circular detector 7. Thus the triangular aperture will be capable of scanning the entire field of view of the detector. The point N is the outer end of side 15. The disc 5 is rotated at a constant angular velocity, $\omega$, in the direction of the arrow 6. The numeral 11 indicates an indexing hole in the chopper disc 5. This hole 11, shown as square has one edge thereof, 12, extending along the same radius of disc 5 on which the longer side 15 of the right triangular aperture is located. The point P is the point of impingement on the detector of the narrow beam.

If we consider the chopper disc 5 for the moment to be stationary and the detector 7 with the point P rotating around 0 in the opposite direction from the actual disc rotation, then the point P would produce the arcuate track S within the triangular aperture. The radius of this arc S is $r=OP=OQ$. It is assumed that the solid portions of the chopper are completely opaque to the beam being measured. Thus the duration of the detected signal at the output of detector 7 is proportional to the angular extent of arc S, which is the angle $\theta_1$. Since the disc angular velocity is constant, then $\theta_1 = \omega t_1$, where $t_1$ is the aforementioned duration of the detected signal for each sweep of the triangular aperture past the detector 7. It is assumed that the beam is fixed in position and of constant intensity during the operation of the chopper. The straight line $QR=h$ is normal to the triangle side 15 and is one half of a chord which subtends an angle equal to $2\theta_1$. The length of "h" may be found if the angles $\theta_1$, $\phi$ and the distance $d=ON$ are known. It can be shown from trigonometry that, $$h = \frac{d \sin \theta_1 \sin \phi}{\sin(\theta_1 + \phi)} \qquad \text{Eq. (1)}$$

and since $h = r \sin \theta_1$, then, $$r = \frac{h}{\sin \theta_1} = \frac{d \sin \phi}{\sin(\theta_1 + \phi)} \qquad \text{Eq. (2)}$$

or, since $\theta_1 = \omega t_1$, then, $$r = \frac{d \sin \phi}{\sin(\omega t_1 + \phi)} \qquad \text{Eq. (3)}$$

The index hole 11 is used to determine the time at which the triangular aperture starts to overlap or sweep the field of view of the detector 7. This occurs when triangle side 15 is tangent to the circular detector 7, as shown in FIG. 1. A light or other similar beam is directed through hole 11 and this light will actuate light detector 13 located as shown behind the chopper disc and having its upper edge coincident with the lower edge of index hole 11 when the side 15 is tangent to the detector 7. The time elapsed between the signal output from detector 13 and the start of the detected beam at the output of detector 7 defines a time period $t_2$ which is proportional to the angle $\theta_2$. If the coordinates x and y of the point P as shown in FIG. 1 are known, the position of the point of impingement relative to the detector 7 is uniquely determined. Since $x = r \sin \theta_2 = r \sin \omega t_2$ and $y = r \cos \theta_2 = r \cos \omega t_2$, x and y can be found by substituting for "r" in these formulas its value from Eq. (3), $$x = \frac{d \sin \phi \sin \omega t_2}{\sin (\omega t_1 + \phi)} \quad \text{Eq. (4)}$$

and, $$y = \frac{d \sin \phi \cos \omega t_2}{\sin (\omega t_1 + \phi)} \quad \text{Eq. (5)}$$

Since the distance "d" and the angle $\phi$ are fixed, the angular velocity $\omega$ is constant and $t_1$ and $t_2$ can be easily measured, these formulas provide a quick and simple way of pinpointing the position of a narrow beam within a relatively large detector. Of course, the location of detector 7 with respect to the disc center 0 is known, thus all possible impingement points can be found.

Stated in words, this method utilizes a triangular or wedge shaped aperture to scan the field of view of the detector 7 so that the radial distance of the point P from the center of rotation 0 can be deduced from the duration of the detected beam in the output of the detector 7. With the geometry shown, this duration increases as the radius of the point P increases. Also, the elapsed time between the start of the scanning cycle indicated by a single output from light detector 13 and the start of the signal from beam detector 7 is a measure of the angular distance from the point of tangency illustrated in FIG. 1 to the position of point P.

It will be apparent that the circular shape of the disc 5 is not important to the practice of this method and other shapes can be used, however the circular shape is perhaps the most practical.

Figure 2A:
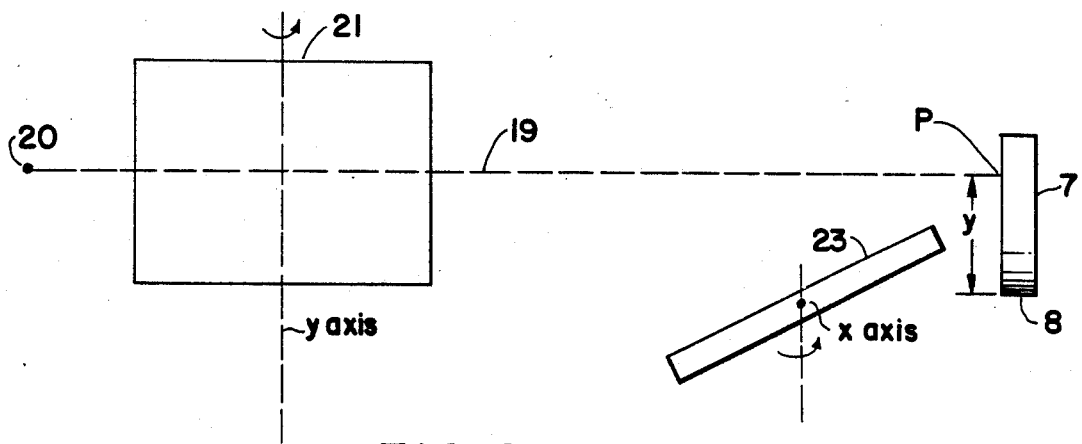
FIGS. 2a, 2b, 3, and 4 are diagrams illustrating the alternate technique utilizing a pair of flat choppers.
Figure 2B:
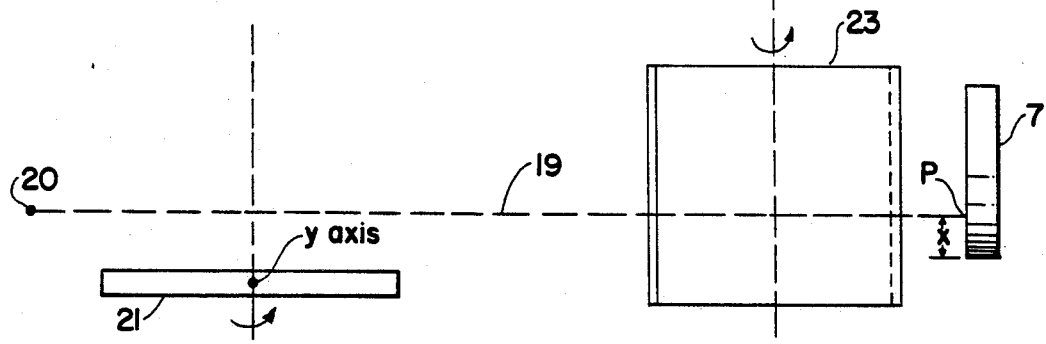

The alternate method is illustrated by the remaining figures of the drawings. FIGS. 2a and 2b are respectively side and top views of the alternate embodiment utilizing a pair of rotating flat choppers which rotate about mutually perpendicular axes alongside the field of view of the flat circular detector 7. In these figures, the rectangular, flat chopper 23 rotates around the horizontal x axis, which passes through the center of this chopper. A second similar chopper plate 21 rotates around the vertical y axis. The numeral 20 represents the source of the beam and 19 is the beam path. The choppers 21 and 23 are offset from each other along the path of the beam and are alternately rotated at constant angular velocity to separately determine the x and y coordinates of the point of impingement P of the beam on the detector 7. For example, as the chopper plate 23 rotates around the x axis as shown in FIG. 2a, it will interrupt the beam at an angular position depending on the distance, y, of the beam from the lower edge 8 of the detector 7. The choppers are made of opaque material and are dimensioned so that they can completely block the field of view of the detector. Thus with rectangular or square choppers rotating around a line passing through their centers, as illustrated in FIGS. 2a and 2b, the length of the chopper normal to its axis of rotation will be just over twice the diameter of the circular detector, so that when a chopper is parallel to the detector, one of its edges which is parallel to its axis of rotation will be lined up with the edge of the detector which is remote from the chopper axis of rotation. The other dimension, for example, the length of chopper 23 along the x axis must be at least slightly longer than the diameter of the detector 7.

Figure 3:
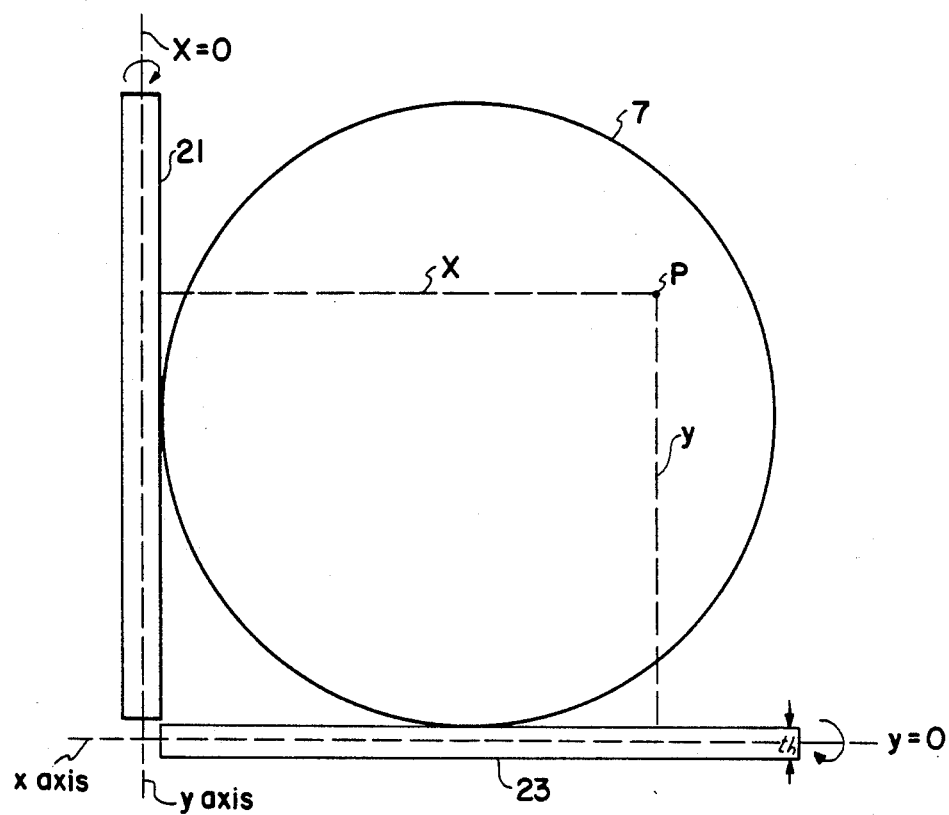

FIG. 3 is a view looking from the source of the beam along the beam toward the detector disc 7, with the two choppers 21 and 23 shown in their rest positions. As can be seen, the x and y axes are 90° apart, the x axis extending horizontally along the lower edge of the detector 7 and the y axis extending vertically along the left edge of the detector but displaced therefrom as shown in FIGS. 2a and 2b. The thickness, th, of the choppers is selected so that in the rest positions as illustrated in FIG. 3, one surface of the choppers is tangent to the circular detector. In FIG. 3, point P is the point of impingement of the beam on the detector.

With this chopper and detector geometry, it will be apparent that by measuring the "on" and "off" times of the detector output as each chopper is separately rotated and the other held stationary in the retracted position, one of the coordinates of the point P can be found. For example, if the beam hits the edge of the detector closest to the axis of chopper rotation, the beam will be blocked all of the time or for a great majority of the time, whereas if the beam hits the diametrically opposite edge of the detector, the beam will never be interrupted or interrupted only for an instant. If the beam hits the center of the detector, both choppers will interrupt it when they are at 45° angles relative to the plane of the detector. In this beam position with choppers of the type illustrated, the beam will be "on" for 90°, "off" for 90°, then "on" again for another 90°, etc. Assuming that the beam is "off" for an angle A of chopper rotation and "on" for another angle D of chopper rotation, the ratio A/D of these two angles will be the same as the ratio of the "off" to "on" times, which is easily measured. Further the sum of the angles A and D is 180°. Thus the two angles can be found and simple trigonometry can be used to find the coordinates given the known chopper and detector geometry. With choppers rotating around an axis through their centers, as shown, the beam is interrupted twice during each revolution. Also, as will appear from the following mathematical analysis, the coordinates can be determined if the "off" time alone is known together with the constant chopper angular velocity, as well as the fixed chopper geometry.

Figure 4:
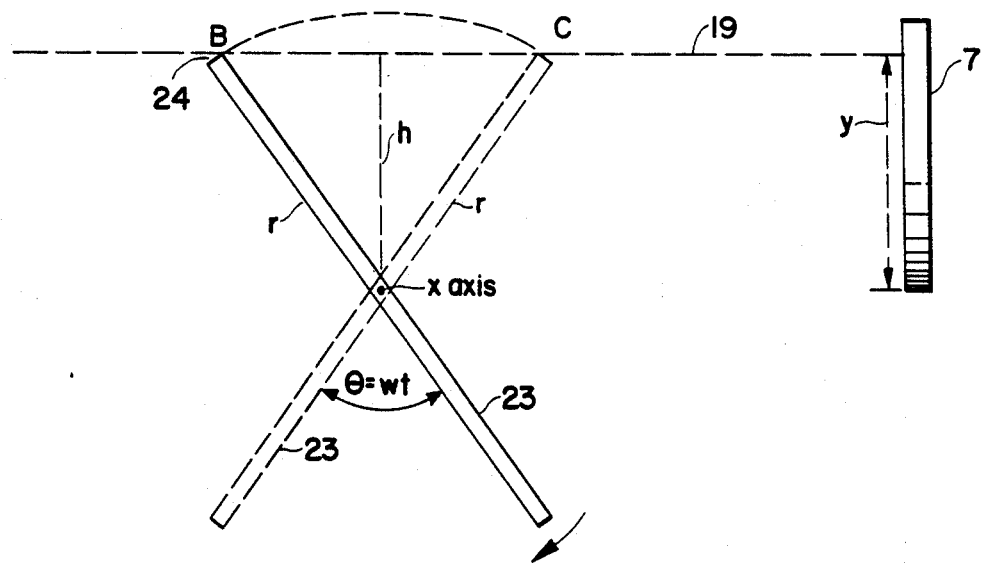

FIG. 4 shows how the coordinates can be calculated using fixed constants and easily obtainable variables. This figure shows a top view of chopper 23 rotating at constant angular velocity, clockwise around the x axis. The distance "r" is the radius of the chopper or the distance from the x axis to the edge 24 of the chopper. The solid line view shows the chopper 23 just as it interrupts the beam 19 and the dashed line view shows the chopper just as the beam becomes unblocked. The height, h, of the chord BC equals the y coordinate. The angle $\theta$ between the two illustrated positions of the chopper is equal to $\omega t$, where $\omega$ is the chopper angular velocity and "t" is the "off" time, which occurs twice in every revolution of the chopper. Thus, $y = h = r \cos \theta/2 = r \cos \omega t/2$, where "t" is the detector signal "off" time for each half revolution of the chopper and $\omega$ is the constant chopper angular velocity. The x coordinate is determined in a similar manner.

Other types of choppers can be used to practice this alternate method. For example, the choppers 21 and 23 could be made only half as long in the direction normal to their axes of rotation and then rotated around one of their ends. Such a chopper would only interrupt the beam once per revolution and it would be unbalanced. For these reasons the longer chopper shown in the drawings which rotates around its center is preferred.

The sensitivity of the detector in the alternate embodiment can be made linear with the off time, "t" by using a variable speed chopper which varies its speed during each revolution. For example, if the chopper angular velocity is arranged such that $\omega t/2 = \cos^{-1} \alpha t$, where $\alpha$ is a constant, then $y = r\alpha t$.

While a right triangular aperture is shown in the illustrative embodiment of FIG. 1, other shapes are possible, as long as the leading edge of the aperture lies on a radius of the disc and the aperture is tapered in some way along this radius. For example, the trailing edge of the aperture, which is the hypotenuse 9 in FIG. 1, need not be a straight line but can be arcuate or a series of connected straight lines. This shape may be selected to produce a desired relationship between the radius of point P and the duration of the detected beam signal.

While the invention has been described in connection with illustrative embodiments, obvious variations therein will occur to those skilled in the art, accordingly the invention should be limited only by the scope of the appended claims.

We claim:

1. A method of determining the point of impingement of a narrow beam on a detector having an area that is large relative to the beam, comprising the steps of: passing said beam through a planar chopper located between the beam source and said detector, said planar chopper rotating at a constant angular velocity around an axis normal to the plane of said detector and offset at a fixed position from the field of view of said detector, said chopper having a triangular aperture therein with the leading edge thereof including a triangle leg which extends along a radius of said chopper for a length that is longer than the widest dimension of said detector, said aperture being located such that it sweeps over the entire field of view of said detector once during each revolution of said chopper, measuring the time duration of signal output from said detector passing through said aperture for each revolution of said chopper and determining from this duration and the geometry of said chopper aperture and said detector the radial distance of said point of impingement from the axis of rotation of said chopper, measuring the elapsed time with no signal output from the start of the scanning of said field of view by said triangular aperture to the start of the detected signal in the output of said detector, and determining from said elapsed time the angular position of said point of impingement relative to said chopper and aperture geometry.

2. The method of claim 1 wherein said detector area is circular and said planar chopper is circular and rotates around its center, said aperture being a right triangle having a long leg along said radius, said chopper including an indexing hole for determining the time at which the aperture starts to scan the detector.

3. A method of determining the point of impingement of a narrow particle or electromagnetic beam on a planar detector, comprising the steps of: sweeping a rotating planar chopper having a triangular aperture of a length longer than the widest dimension of said detector across said detector, measuring the time duration of the detected beam signal passing through said aperture in the output of said detector to determine from the aperture geometry the radial distance of said point of impingement from the axis of rotation of said chopper, and measuring the elapsed time from the start of said sweeping by said aperture until the occurrence of an output from said detector due to said beam to thereby determine the angular position of said point of impingement relative to said chopper and detector geometry.

4. The method of claim 3 wherein said chopper comprises a circular disc rotating around its center, and the leading edge of said aperture extends along a radius of said disc.

* * * * *